US010436310B2

(12) United States Patent
Lindner et al.

(10) Patent No.: US 10,436,310 B2
(45) Date of Patent: Oct. 8, 2019

(54) ACTIVATION APPARATUS FOR A TRANSMISSION OF A MOTOR VEHICLE

(71) Applicant: Bayerische Motoren Werke Aktiengesellschaft, Munich (DE)

(72) Inventors: Matthias Lindner, Graefelfing (DE); Thomas Tille, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 479 days.

(21) Appl. No.: 14/249,832

(22) Filed: Apr. 10, 2014

(65) Prior Publication Data
US 2014/0216193 A1 Aug. 7, 2014

Related U.S. Application Data

(63) Continuation of application No. PCT/EP2012/071782, filed on Nov. 5, 2012.

(30) Foreign Application Priority Data

Nov. 29, 2011 (DE) .......................... 10 2011 087 330

(51) Int. Cl.
*F16H 59/10* (2006.01)
*F16H 61/24* (2006.01)
(Continued)

(52) U.S. Cl.
CPC ........... *F16H 59/10* (2013.01); *F16H 59/105* (2013.01); *F16H 61/24* (2013.01);
(Continued)

(58) Field of Classification Search
CPC ........ F16H 59/10; F16H 59/105; F16H 61/24; F16H 2059/0221; F16H 2059/0295; F16H 2059/085; F16H 2061/243
(Continued)

(56) References Cited

U.S. PATENT DOCUMENTS 2,045,516 A * 6/1936 Brewer ................. B60W 30/18
188/152
5,845,534 A * 12/1998 Kim .................... F16H 59/0217
74/473.12
(Continued)

FOREIGN PATENT DOCUMENTS

DE         197 14 495 A1   10/1998
DE   10 2006 008 816 A1    8/2007
(Continued)

OTHER PUBLICATIONS

Chinese Office Action issued in counterpart Chinese Application No. 201280042885.0 dated Oct. 23, 2015, with English translation (Eight (8) pages).
(Continued)

*Primary Examiner* — William C Joyce
(74) *Attorney, Agent, or Firm* — Crowell & Moring LLP

(57) ABSTRACT

An activation apparatus for a transmission of a motor vehicle includes a gear selector that is configured to move in a shift gate to thereby select first drive programs, and an activation device that is connected to the gear selector. Actuation of only the gear selector activates the first drive programs. The first drive programs include a forward drive program and a reverse drive program. The gear selector is configured take up a monostable rest position in the shift gate. Simultaneous actuation of both the gear selector and the activation device activates a second drive program that is different from the first drive programs. The activation device is a spring-loaded switch that is activated by actuating the gear selector.

8 Claims, 2 Drawing Sheets

(51) Int. Cl.
*F16H 59/02* (2006.01)
*F16H 59/08* (2006.01)

(52) U.S. Cl.
CPC ............... *F16H 2059/0221* (2013.01); *F16H 2059/0295* (2013.01); *F16H 2059/085* (2013.01); *F16H 2061/243* (2013.01); *Y10T 74/2014* (2015.01)

(58) Field of Classification Search
USPC ....................................................... 74/473.3
See application file for complete search history.

(56) References Cited

U.S. PATENT DOCUMENTS

| | | | |
|---|---|---|---|
| 6,046,673 A | | 4/2000 | Michael et al. |
| 6,151,977 A | * | 11/2000 | Menig .................... B60K 20/06 |
| | | | 74/336 R |
| 6,360,624 B1 | * | 3/2002 | Sedlmaier ........... F16H 59/0204 |
| | | | 74/335 |
| 6,732,847 B1 | * | 5/2004 | Wang .................... F16H 59/105 |
| | | | 192/220.4 |
| 8,434,383 B2 | * | 5/2013 | Park .................... F16H 59/0204 |
| | | | 74/473.12 |
| 8,540,605 B2 | * | 9/2013 | Marur .................. F16D 27/108 |
| | | | 192/3.62 |
| 2003/0233897 A1 | * | 12/2003 | Inaba .................... F16H 59/105 |
| | | | 74/335 |
| 2004/0216547 A1 | * | 11/2004 | Shiomi ................. F16H 59/105 |
| | | | 74/335 |
| 2004/0229726 A1 | * | 11/2004 | Wilde .................. F16H 59/0217 |
| | | | 477/99 |
| 2008/0282829 A1 | * | 11/2008 | Giefer ................. F16H 59/0217 |
| | | | 74/473.12 |
| 2011/0277578 A1 | * | 11/2011 | McGuire ............. F16H 59/0278 |
| | | | 74/473.3 |
| 2012/0291579 A1 | | 11/2012 | Kamoshida |

FOREIGN PATENT DOCUMENTS

| | | |
|---|---|---|
| DE | 10 2006 059 992 A1 | 6/2008 |
| DE | 10 2007 036 086 A1 | 2/2009 |
| DE | 10 2009 039 113 A1 | 3/2011 |
| JP | 57-192827 * | 12/1982 |
| JP | 2008-155727 * | 7/2008 |
| WO | WO 2011/090011 A1 | 7/2011 |

OTHER PUBLICATIONS

International Search Report dated Dec. 14, 2012 with English translation (seven (7) pages).
German-language Written Opinion (PCT/ISA/237) dated Dec. 14, 2012 (eight (8) pages).
German-language Search Report dated Mar. 27, 2012 with English translation (ten (10) pages).

* cited by examiner

ACTIVATION APPARATUS FOR A TRANSMISSION OF A MOTOR VEHICLE

CROSS REFERENCE TO RELATED APPLICATIONS

This application is a continuation of PCT International Application No. PCT/EP2012/071782, filed Nov. 5, 2012, which claims priority under 35 U.S.C. § 119 from German Patent Application No. 10 2011 087 330.9, filed Nov. 29, 2011, the entire disclosures of which are herein expressly incorporated by reference.

BACKGROUND AND SUMMARY OF THE INVENTION

The present invention relates to an activation apparatus for a transmission of a motor vehicle having a gear selector movable in a shift gate for the selection of at least one forward drive program and a reverse drive position of the transmission, wherein the gear selector is designed for taking up a monostable rest position in the shift gate.

As a rule, an activation apparatus having a gear selector is provided in the vehicle interior of known vehicles for activating automatic vehicle transmissions, which gear selector can be moved by the driver in a shift gate for selecting different drive programs—a forward drive program, a reverse drive position and for the selection of a neutral position of the transmission. The activation of the gear selector results in a control command that is transmitted to a transmission control device. Added to the above-mentioned drive programs is a parking lock circuit which, in the case of some activation apparatuses, can also be selected by use of the gear selector and, in the case of other activation apparatuses, can be selected by use of an activation pushbutton provided specifically for this purpose and arranged, for example, on the gear selector or adjacent to the latter. When the parking lock is activated, the transmission will be mechanically locked.

From German Patent document DR 10 2006 008 816 A1, an activation apparatus for a transmission of a motor vehicle has become known, having a gear selector movable in a shift gate, for the selection of a forward drive program and a reverse drive position of the transmission. The gear selector is designed for taking up a first or a second rest position in the shift gate. From the first rest position, the gear selector can be activated for selecting the reverse drive position. From the second rest position, the gear selector can be moved into the first engaged position, for selecting the forward drive program. In addition, for selecting a further drive program, such as a sports drive program, the gear selector can be moved beyond the first engaged position into a second engaged position. In addition, by means of the activation, the gear selector can be moved from the first rest position into the second rest position, and from the second rest position into the first rest position. In this manner, a further drive program can be selected, in addition to the reverse drive position and the forward drive program, within a single shift gate. However, the gear selector is not always in the ergonomically most favorable position.

From German Patent document DE 10 2009 039 113 A1, an activation apparatus for a transmission of a motor vehicle has become known, which has a gear selector movable in a shift gate, for the selection of a forward drive program and a reverse drive position of transmission, the gear selector being designed for taking up a monostable rest position in the shift gate. In addition, the gear selector is designed for the selection of a further drive program, specifically a sports drive program. When a neutral position is engaged, and the gear selector is in the monostable rest position, the gear selector can be moved into a first engaged position for the selection of the forward drive program, and it can be moved into a second engaged position for selecting the sports drive program by a further pivoting, after the first engaged position has been reached. In this manner, the driver can directly select the reverse drive position, the forward drive program and the sports drive program directly from the neutral position. Furthermore, the gear selector will always spring back into a single monostable rest position, so that the driver can always activate the gear selector from an ergonomically favorable position.

From an arrangement originating from the applicant, an activation apparatus for a transmission of a motor vehicle has become known, which has a gear selector movable in a shift gate for the selection of a forward drive program, a reverse drive position and a sports drive program of the transmission, the gear selector being designed for taking up a monostable position in the shift gate. Here also, the gear selector can additionally be moved into a first engaged position for the selection of the forward program and into a second engaged position for the selection of the sports drive program, when a neutral position is engaged and the gear selector is in a monostable rest position. Added to the mentioned drive programs is a parking lock circuit, which can be selected by use of an activation pushbutton provided specifically for this purpose and arranged adjacent to the gear selector.

Although the known activation apparatus for selecting drive programs of a transmission has already proven itself in practice, there are still possibilities for improvement. In order to select the sports drive program from the neutral position, the driver first has to move the gear selector into a first engaged position and, after the first engaged position has been reached, continue to move it in the same direction until the gear selector reaches a second engaged position. This takes a relatively long time and is against the driver's intuition since the driver has to move the gear selector twice in the same direction for selecting the sports drive program because, after reaching the engaged position of the forward program, the gear selector has to continue to be moved in the same direction.

It is therefore an object of the present invention to provide an activation apparatus for a transmission of a motor vehicle by which the direct selection of the reverse drive position, the forward drive program and at least one further drive program from the neutral position will be more comfortable for the driver and more amenable to his intuition.

The invention achieves this and other objects by providing an activation apparatus for a transmission of a motor vehicle having a gear selector movable in a shift gate for the selection of at least one forward drive program and a reverse drive position of the transmission, the gear selector being designed for taking up a monostable rest position in the shift gate. The activation apparatus is designed for the selection of at least one further drive program by an at least partially simultaneous and/or sequential activation of the gear selector and of an activation device arranged on the gear selector. In that case, the activation device is, for example, an activation pushbutton, by which an electric switch can be activated.

The at least partially simultaneous activation of the gear selector and the activation device include completely simultaneous activations, i.e. activations by which the gear selector and the activation device are activated during the same time period, as well as only partially simultaneous activations, by which the gear selector and the activation device are not activated during the same time period. In the latter case, the driver, for example, starts an activation of the gear selector and of the activation device, and then terminates the activation of the activation device while he continues the activation of the gear selector.

A sequential activation of the gear selector and of the activation device should be understood to be a delayed activation. The driver, for example, first activates the activation device and subsequently the gear selector. The further drive program is thereby selected by a sequential activation of the activation device and of the gear selector, whereas, by means of a sole activation of the gear selector, without the activation of the activation device, for example, the forward drive program can be selected.

By means of the activation apparatus according to the invention, a driver can, in addition to the forward drive program and the reverse drive position, also directly select the further drive program from the monostable rest position of the gear selector by the simultaneous and/or sequential activation of the gear selector and of the activation device. Differently than in the case of the above-mentioned known devices, he does not have to move the gear selector into different engaged positions in order to reach all drive programs. The selection of drive programs thereby becomes more comfortable and more amenable to intuition than in the case of the known devices, and the direct reaching of the further drive programs is facilitated and takes place more rapidly. As a result, the operating reliability is also increased, and faulty operations are reduced.

In addition, the selection of the drive programs takes place from within only a single shift gate. As a result, costs and space can be saved when an activation device according to the invention is installed into a vehicle.

The forward drive program is a drive program by which an automatic shifting takes place between different forward drive positions, for example, as a function of the rotational engine speed and/or other driving operation parameters, as is customary in the case of known automatic transmissions.

As a rule, a neutral position is also added to the above-mentioned drive programs. This neutral position is preferably, in each case, temporarily selected for a short time when, while the reverse drive position is selected, the driver changes over to the forward drive program, or when, while the forward drive program is selected, the driver changes over to the reverse drive position. The activation apparatus according to the invention therefore also meets preconditions according to which a direct change from the reverse drive position to the forward drive program or from the forward drive program to the reverse position is inadmissible.

According to a preferred embodiment, the activation device is designed for activation by applying a compressive force or tensile force upon the gear selector.

In this case, the invention comprises embodiments, in which the activation device offers both possibilities for the activation, thus the application of a compressive force or a tensile force, and also embodiments, in which the activation device is designed for the activation by one of the two mentioned forces.

The driver will then, for example, select the forward drive program in that he activates the gear selector without additionally applying a compressive or tensile force, and he will the select the further drive program in that he activates the gear selector and simultaneously applies a compressive force or a tensile force to the gear selector.

According to a preferred further development of the invention, the activation device further has a spring-loaded switch which can be activated by the activation of gear selector.

The operation activating the spring-loading switch preferably is a different activation than the swiveling of the gear selector in the shift gate. The operation for activating the spring-loading switch is, for example, an application of compressive force upon the gear selector, so that the latter is displaced in the downward direction against the spring force, and the spring-loaded switch is closed.

According to a preferred embodiment, the gear selector can be moved into a first engaged position by a swiveling in one direction and can be moved into a second engaged position by a further swiveling in the same direction.

In contrast to the monostable rest position, the engaged position is only semistable, i.e. the gear selector springs back from the engaged positions into the monostable rest position as soon as the driver no longer activates the gear selector.

As a rule, the shift gate extends in the longitudinal direction of the vehicle. The gear selector can then preferably be moved by swiveling toward the front into two engaged positions and can be moved by swiveling toward the rear also into two engaged positions. However, the number "two" of engaged positions is not a limitation. The invention includes, for example, also embodiments in which the gear selector can be moved in one direction, for example, into one engaged position and can be moved in the other direction also into one or into more engaged positions.

According to an advantageous further development of the invention, the activation apparatus, in addition, has a device for activating and/or deactivating a parking lock, which device is arranged on the gear selector or adjacent to it. The device is, for example, an activation pushbutton arranged on the gear selector.

According to a further embodiment of the activation apparatus according to the invention, the gear selector is designed for, when the parking lock is activated, selecting the forward drive program by swiveling the gear selector from its rest position into a first engaged position and selecting the further drive program by an activation of the activation device and a swiveling of the gear selector to the first engaged position.

When the parking lock is activated, the transmission is locked. It corresponds to the driver's intuition that he has to swivel the gear selector by one position, thus, from the rest position to the first engaged position, in order to select the forward drive program. The further drive program is, for example, a sports drive program. In this embodiment, also this drive program can be selected by swiveling the gear selector by one position, thus into the same engaged position, while the activation device is activated simultaneously.

The selection of the forward drive program can preferably be carried out by swiveling the gear selector toward the rear. The further drive program, thus, for example, the sports drive program, can then also be selected by swiveling the gear selector toward the rear, while the activation device is activated simultaneously.

The activation apparatus according to the invention can, in addition, preferably be used for selecting the reverse drive position, while the parking lock is activated by swiveling the gear selector from the rest position into a third engaged position.

In this case, the third engaged position indicates an engaged position which can be reached by a swiveling of the gear selector that is opposite to that for achieving the first engaged position. Whereas the first engaged position is reached, for example, by swiveling toward the rear, the third engaged position is reached by swiveling toward the front. The reverse drive position can preferably be selected by a swiveling of the gear selector toward the front.

According to a preferred embodiment, the gear selector is, in addition, designed for selecting a neutral position by swiveling the gear selector from the rest position into a first engaged position when the reverse drive position is selected, and for selecting the forward drive program by swiveling into a second engaged position.

It corresponds to the driver's intuition that he first arrives in the neutral position from the reverse drive position, and arrives in the forward drive program by a further activation of the gear selector. It can therefore be simultaneously implemented that the activation apparatus according to the invention has a monostable rest position, and simultaneously an activation corresponding the intuition can always be carried out for the selection of drive programs. This means, for example, that, when the parking lock is activated, or when the neutral position is selected, an activation into the first engaged position will be sufficient for selecting the forward drive program, while, when the reverse drive position is activated, an activation of the gear selector is required beyond the first engaged position into the second engaged position.

Preferably also when the forward drive program is selected, the gear selector is designed for selecting a neutral position for swiveling the gear selector from the rest position into a third engaged position, and for selecting the reverse drive position by swiveling into a fourth engaged position. In this manner, also the swiveling of the gear selector for selecting the neutral position and the reverse drive position when the forward drive program is selected, corresponds to the driver's intuition.

According to a further embodiment of the activation apparatus according to the invention, the gear selector is designed, when the forward drive program is selected, for selecting the further drive program by swiveling the gear selector in the same direction into which the gear selector is swiveled for selecting the forward drive program, and for selecting the forward drive program by swiveling in the same direction when the further drive program is selected.

According to a further embodiment of the activation apparatus according to the invention, the gear selector has, at its lower end, a detent pin prestressed by way of a spring. This pin, in the monostable rest position of the gear selector, can engage in a rest detent position and, by means of swiveling the gear selector, can engage in at least one further detent position.

By an activation of the gear selector, the latter can be swiveled against the spring force so that also the lower end is moved out of the rest detent position. At the lower end of the gear selector, the detent pin is arranged which is designed for engaging in detent positions. In contrast to the monostable rest detent position, the further detent position instable in that the gear selector springs back into the rest position as soon as the gear selector is not activated and, as a result, also the lower end springs back into the rest detent position. The further detent position corresponds to an engaged position of the gear selector and is perceptible by the driver, so that the driver feels when he has reached the corresponding engaged position by swiveling the gear selector.

The further detent position or several further detent positions are implemented, for example, as indentations in a surface, by way of which the lower end of the gear selector is moved during swiveling. As a result of the spring force, the lower end will engage in the detent positions when it is moved by way of one of the indentations.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
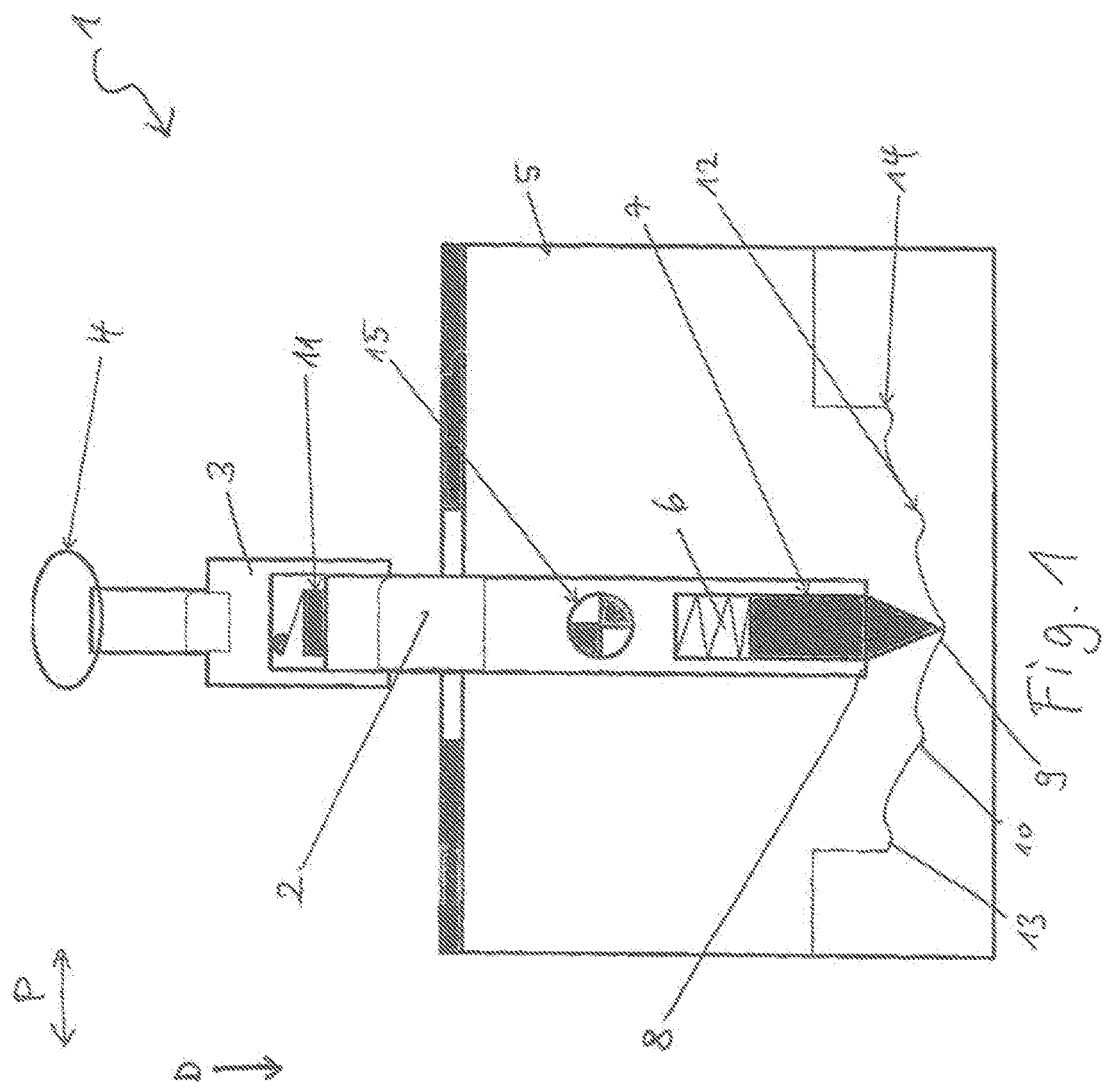
FIG. 1 is a longitudinal sectional view of a schematically illustrated activation device according to an embodiment of the invention.

FIG. 1 is a longitudinal sectional view of an activation apparatus 1 according to an embodiment of the invention. The activation apparatus is used for selecting drive programs of a transmission (not shown here) in a vehicle (also not shown here). The activation apparatus 1 has a gear selector 2 with a gear knob 4, which is movable in a shift gate in the longitudinal direction of the vehicle, indicated by means of a double arrow P, for the selection of the drive programs. In addition, the gear selector 2 is designed for taking up a monostable rest position in which the gear selector 2, as illustrated in FIG. 1, takes up a largely vertical position.

In addition, the activation apparatus 1 has an activation device 3. By means of the activation apparatus 1, a forward drive program, a neutral position, and a reverse drive position, can be selected. By the simultaneous activation of the gear selector 2 and of the activation device 3, in addition, a further drive program, in the illustrated case, a sports drive program, can be selected.

When the neutral position is engaged, the driver can select the forward drive program in that he swivels the gear selector toward the rear. As a result, the forward drive program D illustrated in FIG. 2 can be selected. By means of a swiveling of the upper end of the gear selector 2 in the figure plane toward the right, the gear selector 2 is swiveled about a pivot 15, and the lower end 8 of the gear selector 2 situated inside the housing 5 is displaced in the opposite direction, which in the plane of the figure is toward the left.

The lower end 8 has a detent pin prestressed by way of a spring 6. The detent pin 7 engages in a rest detent position 9 when the gear selector 2 takes up its monostable rest position. By swiveling the gear selector 2 from its neutral position to select the forward drive program, the detent pin 7 will reach a first engaged position in which it engages in a first detent position 10. As soon as the gear selector 2 has reached the first detent position 10, the forward drive program is selected. The driver can release the gear selector 2, whereupon the latter springs back from the first detent position 10 into the monostable rest position with the rest detest position 9.

Figure 2:
FIG. 2 is a schematic representation of a shifting diagram of the activation device according to an embodiment of the invention.
Figure 2:
Figure 2:

The driver can also directly select a sports drive program from the neutral position, which sports drive program is marked by the letter S in FIG. 2. For this purpose, he also swivels the gear selector 2 into the first engaged position and simultaneously activates the activation device 3. The activation device 3 has an electric switch 11, which is activated when the driver applies a compressive force to the gear selector 2 in the direction of the arrow D (downward in the plane of the drawing). When he presses the gear selector 2 downward and swivels it into the first engaged position, the further drive program will be selected. When the driver removes the compressive force acting in the direction of the arrow D, the shifting knob 4, assisted by a spring device not shown in detail, will return to its initial position. When the transmission already is in a forward drive program D, the driver can select the further drive program S by swiveling the gear selector 2 from the monostable rest position toward the rear and can change back into the forward drive program D by another swiveling of the gear selector 2 toward the rear.

For selecting the reverse drive position R from the neutral position N of FIG. 2, the driver has to swivel the gear selector 2 from its monostable rest position toward the front into a third engaged position. The third engaged position is reached when the detent pin 7 engages in a third detent position 12.

On the other hand, when the driver wants to select the forward drive program—not from the neutral position but while the reverse drive position is already selected—he has to swivel the gear selector 2 not only to the first engaged position but to a second engaged position. The neutral position is selected as soon as the gear selector 2 is swiveled toward the rear and the detent pin 7 engages in the first detent position 10.

The driver now has to swivel the gear selector 2 still farther toward the rear into the second engaged position until the detent pin 7 engages in a second detent position 13. As soon as the second engaged position has been reached, the forward drive program is selected. The driver can then release the gear selector 2 again, whereupon the latter springs back into the monostable rest position.

In order to select the reverse drive position from the forward drive program, in the illustrated embodiment, the gear selector 2 also has to be swiveled farther forward than from the neutral position. The neutral position is selected when the gear selector 2 reaches the third engaged position, and the detent pin engages in the third detent position 12. When the gear selector 2 is swiveled farther toward the front into a fourth engaged position, the detent pin 7 will engage in a fourth detent position 14. The reverse drive position has then been selected.

In this manner, irrespective of the currently selected drive program, a swiveling motion of the gear selector 2 for the selection of drive programs will then always be required, which is intuitively clear to the driver.

In order to select the forward drive program or the reverse drive position, the driver always has to swivel the gear selector from the neutral position by only one detent position. In contrast in order to change from the forward drive program to the reverse drive position or, from the reverse drive position to the forward drive program, the driver has to swivel the gear selector 2 by two detent positions because, after a swiveling by one detent position, he first arrives in the neutral position.

LIST OF REFERENCE SYMBOLS

1 Activation apparatus
2 Gear selector
3 Activation device
4 Shifting knob
5 Housing
6 Spring
7 Detent pin
8 Lower end of gear selector
9 Rest detent position
10 First detent position
11 Electric switch
12 Third detent position
13 Second detent position
14 Fourth detent position
15 Pivot
P Double arrow
D Arrow compressive force The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof

What is claimed is:

1. An activation apparatus for a transmission of a motor vehicle, comprising:
   a gear selector that is configured to move in a shift gate to thereby select first drive programs; and
   an activation device that is provided on the gear selector, wherein
      actuation of the gear selector activates the first drive programs, the first drive programs including a forward drive program and a reverse drive program,
      the gear selector is configured take up a monostable rest position in the shift gate,
      simultaneous actuation of both the gear selector and the activation device along two different directions activates a second drive program that is different from the first drive programs,
      the activation device is a spring-loaded switch that is activated by actuating the gear selector,
      the second drive program is a sport mode of the motor vehicle, and
      the simultaneous actuation of both the gear selector and the activation device if affected by applying a compressive force to the gear selector, while pressing down on the gear selector to activate an electrical switch, the electrical switch actuating the activation device.

2. The activation apparatus according to claim 1, wherein the gear selector is movable into a first engaged position by a swivel movement in one direction and is movable into a second engaged position by a further swivel movement in the same direction.

3. The activation apparatus according to claim 2, wherein the gear selector is configured to select the reverse drive position by swiveling the gear selector from the rest position into a third engaged position when a parking lock is activated.

4. The activation apparatus according to claim 1, further comprising:
   a parking lock activation device arranged on or adjacent to the gear selector, the parking lock activation device being configured to activate and/or deactivate a parking lock.

5. The activation apparatus according to claim 4, wherein the gear selector is configured to select the forward drive program by a swivel movement of the gear selector from the rest position into a first engaged position when the parking lock is activated, and to select the further drive program by activating the activation device and swiveling the gear selector into the first engaged position.

6. The activation apparatus according to claim 1, wherein, when the reverse drive position is selected, the gear selector is configured to select a neutral position by swiveling the gear selector from the rest position into a first engaged position, and to select the forward drive program by swiveling the gear selector into a second engaged position.

7. The activation apparatus according to claim 6, wherein, when the forward program is selected, the gear selector is configured to select a neutral position by swiveling the gear selector from the rest position into a third engaged position, and to select the reverse drive position by swiveling the gear selector into a fourth engaged position.

8. The activation apparatus according to claim 1, wherein the gear selector comprises a detent pin arranged at a lower end thereof, the detent pin being prestressed via a spring; and wherein the detent pin is engagable in a rest detent position in the monostable rest position of the gear selector and, via swiveling of the gear selector, the detent pin is engagable in at least one further detent position.

* * * * *